United States Patent
Chen

(10) Patent No.: US 10,376,805 B1
(45) Date of Patent: Aug. 13, 2019

(54) INTERLOCKING ROTATABLE ASSEMBLY

(71) Applicant: Teng-Kuei Chen, Taipei (TW)

(72) Inventor: Teng-Kuei Chen, Taipei (TW)

( * ) Notice: Subject to any disclaimer, the term of this patent is extended or adjusted under 35 U.S.C. 154(b) by 0 days.

(21) Appl. No.: 16/101,738

(22) Filed: Aug. 13, 2018

(51) Int. Cl.
   *A63H 33/10* (2006.01)
   *B29C 45/06* (2006.01)

(52) U.S. Cl.
   CPC ......... *A63H 33/105* (2013.01); *A63H 33/102* (2013.01); *B29C 45/062* (2013.01)

(58) Field of Classification Search
   CPC .. A63H 33/105; A63H 33/102; A63H 33/002; A63H 33/00; A63H 27/02; A63H 17/264; A63G 17/21; A63G 17/16; B29C 45/062; F16C 11/10
   USPC ................................... 446/122, 118; 403/53
   See application file for complete search history.

(56) References Cited

U.S. PATENT DOCUMENTS

| | | | | |
|---|---|---|---|---|
| 2,984,935 A * | 5/1961 | Beck | ...................... | A63H 33/06 446/114 |
| 3,583,091 A * | 6/1971 | Brockway | ............... | A63H 33/00 446/121 |
| 4,789,370 A * | 12/1988 | Ellefson | ............... | A63H 33/062 446/113 |
| 5,593,337 A * | 1/1997 | Lapointe | ............... | A63H 33/084 446/125 |
| 5,938,497 A * | 8/1999 | Mott | ...................... | A63H 33/10 446/122 |
| 6,149,487 A * | 11/2000 | Peng | ...................... | A63H 33/08 446/108 |
| 6,572,429 B2 * | 6/2003 | Cheung | ................ | A63H 33/062 446/120 |
| 7,540,215 B2 * | 6/2009 | Hoberman | ............ | E04B 1/3441 428/12 |
| 9,004,799 B1 * | 4/2015 | Tibbits | ..................... | F16C 11/10 403/113 |
| 9,056,260 B2 * | 6/2015 | Barcelo | ................ | A63H 33/101 |
| 9,458,872 B2 * | 10/2016 | Nelson | ................... | F16B 7/0446 |
| D788,857 S * | 6/2017 | Gutierrez | ...................... | D21/488 |
| 9,914,063 B1 * | 3/2018 | McCoskery | ............ | A63H 29/08 |
| 2004/0224601 A1 * | 11/2004 | Bagley | .................. | A63H 33/062 446/85 |
| 2009/0004946 A1 * | 1/2009 | Sinisi | ................... | A63H 33/082 446/124 |
| 2015/0260206 A1 * | 9/2015 | Acerra | ................. | A63H 33/084 403/364 |

(Continued)

*Primary Examiner* — Michael D Dennis
(74) *Attorney, Agent, or Firm* — Birch, Stewart, Kolasch & Birch, LLP

(57) ABSTRACT

An interlocking rotatable assembly includes multiple interlocking pieces. Each of the interlocking pieces has a disk, a center hole formed through a center of the disk, a mounting slit radially formed in a peripheral edge of the disk, two arms, and two engaging protrusions. The arms parallelly protrude from the peripheral edge of the disk and are oppositely disposed beside the mounting slit. The engaging protrusions protrude from the arms respectively. No undercut is formed on each of the interlocking pieces. Therefore, only a female die and a male die are needed when manufacturing the interlocking pieces by injection molding process. Molds and manufacturing process for manufacturing the interlocking piece are simplified. Accordingly, mold cost and manufacturing cost of the interlocking piece are reduced, and defect-free rate of the interlocking piece can be increased.

10 Claims, 18 Drawing Sheets

(56) References Cited

U.S. PATENT DOCUMENTS

| | | | |
|---|---|---|---|
| 2016/0303487 A1* | 10/2016 | Ayers | A63H 33/105 |
| 2018/0193763 A1* | 7/2018 | Heo | A63H 33/08 |
| 2018/0326319 A1* | 11/2018 | Purwar | A63H 33/101 |
| 2018/0369703 A1* | 12/2018 | Sorias | A63H 33/00 |
| 2019/0015757 A1* | 1/2019 | Mak | A63H 1/00 |
| 2019/0111356 A1* | 4/2019 | Qi | A63H 33/00 |

* cited by examiner

INTERLOCKING ROTATABLE ASSEMBLY

BACKGROUND OF THE INVENTION

1. Field of the Invention

The present invention relates to an interlocking assembly, especially to an interlocking rotatable assembly that is used as a fidget toy for reducing pressure and relieving anxiety.

2. Description of the Prior Art(s)

It has been reported that fidgeting with an object in the hand helps people to stay focused when doing a long task or sitting still and attentive in a long meeting.

With reference to FIG. 17, a conventional interlocking rotatable assembly is a kind of fidget toy and is formed by connecting multiple interlocking pieces 20. With further reference to FIG. 18, each of the interlocking pieces 20 has a disk 21, two pivot protrusions 22, a mounting slit 23, and two arms 24. The disk 21 is flat. The two pivot protrusions 22 respectively protrude from two opposite side surfaces of the disk 21 and are disposed at a center of the disk 21. The mounting slit 23 is formed in a peripheral edge of the disk 21 and extends along a radial direction of the disk 21. The two arms 24 parallelly protrude from the peripheral edge of the disk 21 and are oppositely disposed beside the mounting slit 23. Each of the arms 24 has a hook portion 241 formed on a distal end of the arm 24.

Thus, as shown in FIG. 17, when connecting the interlocking pieces 20, the disk 21 of a first one of the interlocking pieces 20 is inserted into the mounting slit 23 of a second one of the interlocking pieces 20, and the hook portions 241 of the second one of the interlocking pieces 20 hook on the two pivot protrusions 22 of the first one of the interlocking pieces 20 respectively. In this way, the interlocking pieces 20 can be connected in series, and then in a circle.

As shown in FIG. 17, the conventional interlocking assembly is formed by connecting six interlocking pieces 20 in a circle, wherein three of the interlocking pieces 20 are arranged as an inner circle and three of the interlocking pieces 20 are arranged as an outer circle. When the conventional interlocking assembly is in use, a user flips the three interlocking pieces 20 arranged as the inner circle outwardly. Thus, the three interlocking pieces 20 that was originally arranged as the inner circle become being arranged as the outer circle, and the three interlocking pieces 20 that was originally arranged as the outer circle become being arranged as the inner circle. The user fidgets the conventional interlocking assembly by continuously flipping the three interlocking pieces 20 arranged as the inner circle outwardly.

As shown in FIG. 18, the interlocking pieces 20 may be made by injection molding process. However, each of the hook portions 241 forms an undercut. In order to form the undercuts on the interlocking piece 20, a mold for forming the interlocking piece 20 should include a female die, a male die, and a slide at least. Therefore, the mold and manufacturing process for manufacturing the interlocking piece are complicated. Moreover, mold cost and manufacturing cost of the interlocking piece of the conventional interlocking assembly is high, and defect-free rate of the interlocking piece of the conventional interlocking assembly is low.

Moreover, due to the pivot protrusions 22 on the side surfaces of the disk 21, the side surfaces of the disk 21 are not flat plane. Consequently, it is hard to print patterns on the side surface of the disk 21, such that each interlocking piece 20 of the conventional interlocking rotatable assembly is monotonous.

To overcome the shortcomings, the present invention provides an interlocking rotatable assembly to mitigate or obviate the aforementioned problems.

SUMMARY OF THE INVENTION

The main objective of the present invention is to provide an interlocking rotatable assembly. The interlocking rotatable assembly includes multiple interlocking pieces. Each of the interlocking pieces has a disk, a center hole, a mounting slit, two arms, and two engaging protrusions. The center hole is disposed at a center of the disk and is formed through two opposite side surfaces of the disk. The mounting slit is formed in a peripheral edge of the disk and extends along a radial direction of the disk. Two first inner side surfaces are oppositely defined in the mounting slit. The arms parallelly protrude from the peripheral edge of the disk and are oppositely disposed beside the mounting slit. Each of the arms has a distal end and a second inner side surface. The second inner side surface of one of the arms faces the second inner side surface of the other arm and is connected with a corresponding one of the first inner side surfaces. The engaging protrusions protrude from the second inner side surfaces of the arms respectively. The disk of a first one of the interlocking pieces is inserted into the mounting slit of a second one of the interlocking pieces, and the engaging protrusions of the second one of the interlocking pieces oppositely engage in the center hole of the first one of the interlocking pieces.

Since no undercut is formed on each of the interlocking pieces, only a female die and a male die are needed when manufacturing the interlocking pieces by injection molding process. Therefore, molds and manufacturing process for manufacturing the interlocking piece are simplified. Accordingly, mold cost and manufacturing cost of the interlocking piece are reduced, and defect-free rate of the interlocking piece can be increased.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
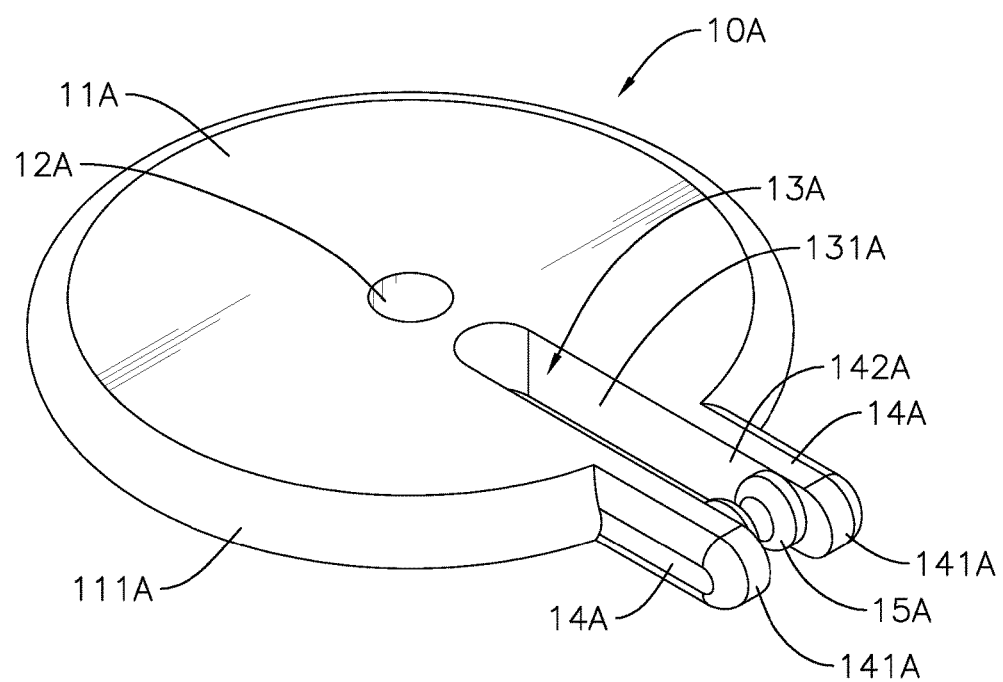
FIG. 1 is a perspective view of a first embodiment of an interlocking piece of an interlocking rotatable assembly in accordance with the present invention.
Figure 2:
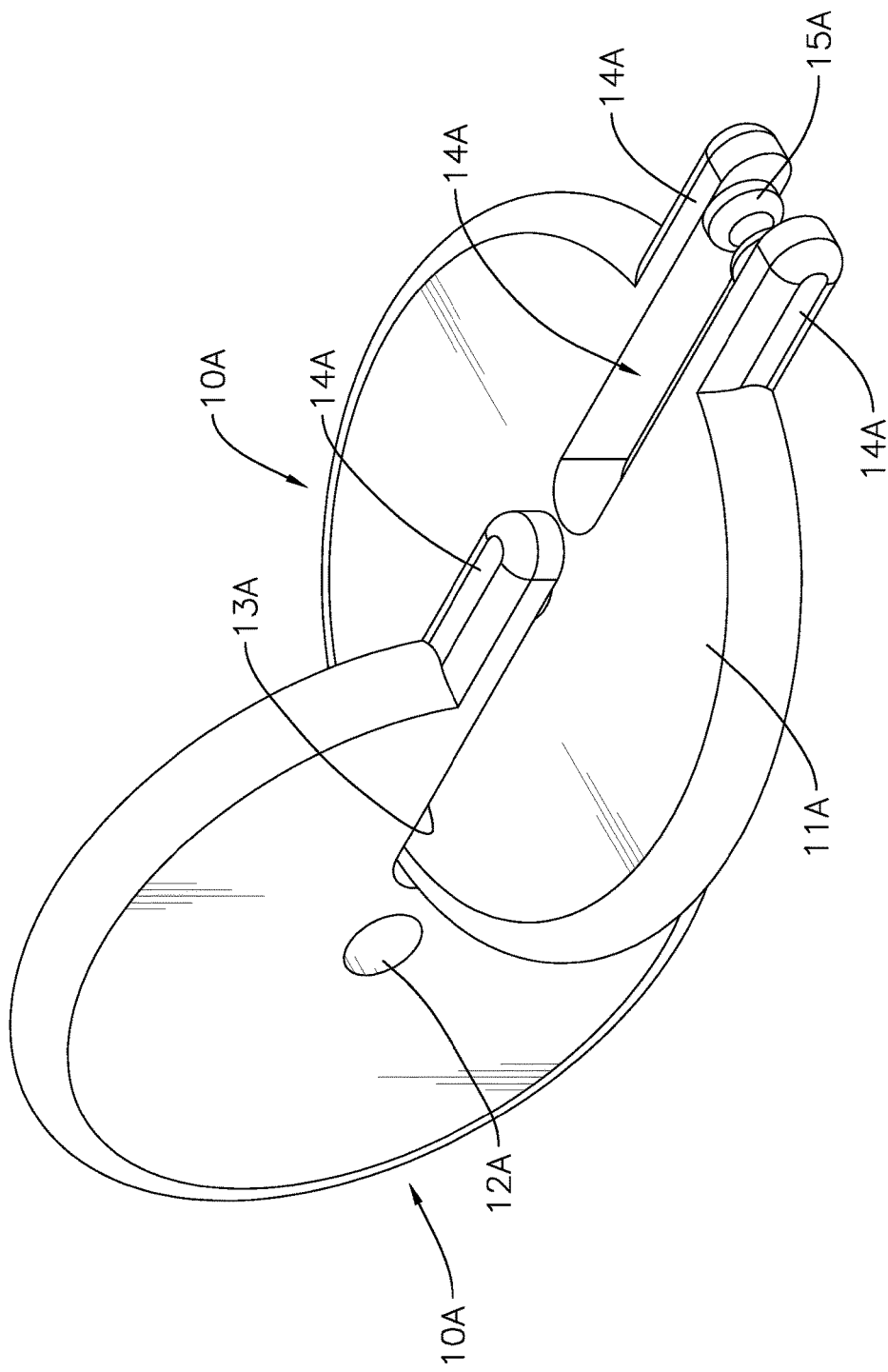
FIG. 2 is a perspective view of the interlocking rotatable assembly, showing formed by connecting two interlocking pieces in FIG. 1.
Figure 3:
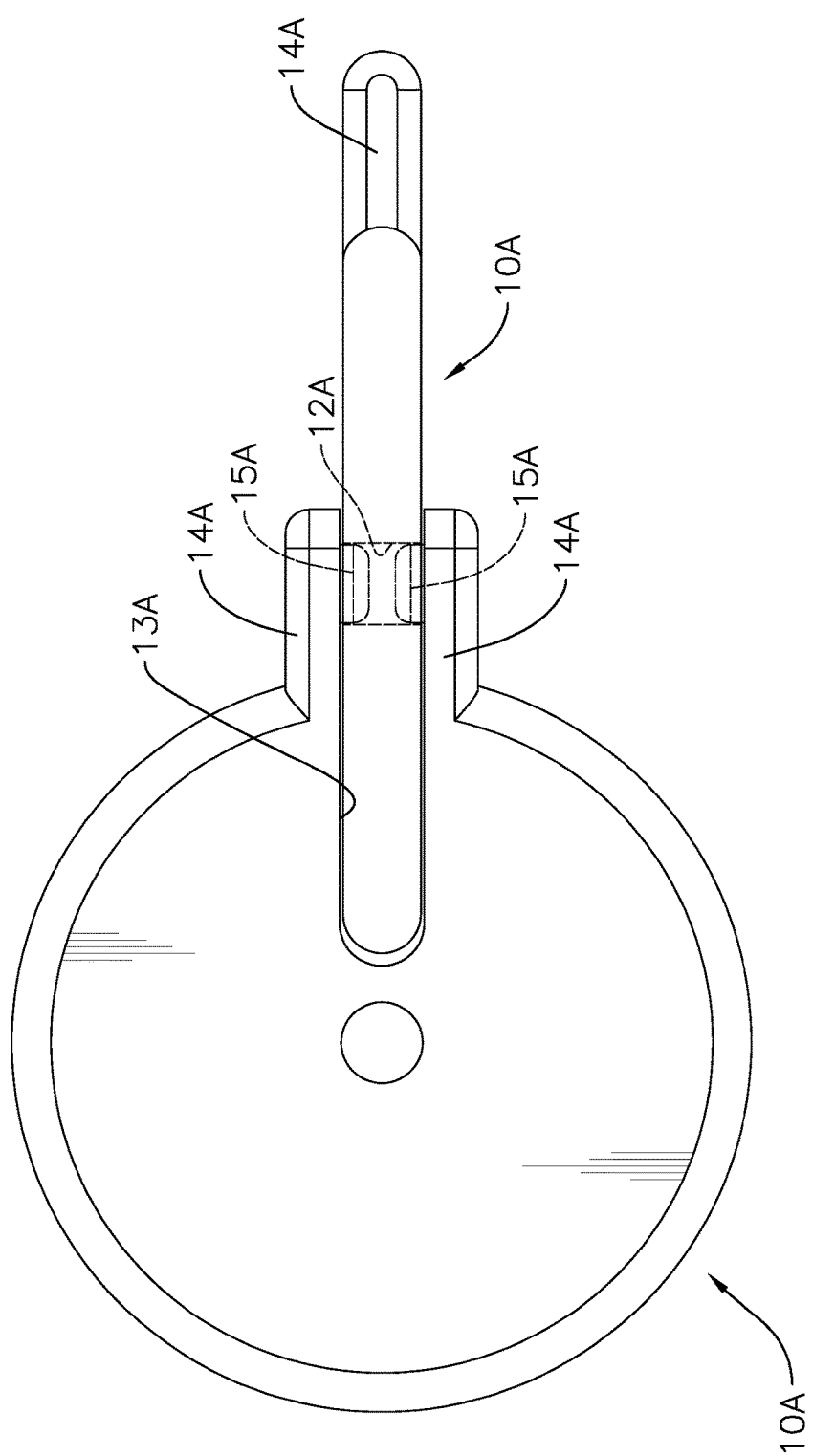
FIG. 3 is a side view of the interlocking rotatable assembly in FIG. 2.

With reference to FIGS. 1 to 3, a first preferred embodiment of an interlocking rotatable assembly in accordance with the present invention comprises multiple interlocking pieces 10A. Each of the interlocking pieces 10A has a disk 11A, a center hole 12A, a mounting slit 13A, two arms 14A, and two engaging protrusions 15A.

As shown in FIG. 1, the disk 11A is flat and circular and has two opposite side surface and an outer peripheral edge 111A. The center hole 12A is disposed at a center of the disk 11A and is formed through the two opposite side surfaces of the disk 11A. The mounting slit 13A is formed in the peripheral edge 111A of the disk 11A and extends along a radial direction of the disk 11A. Two first inner side surfaces 131A are oppositely defined in the mounting slit 13A.

The two arms 14A parallelly protrude from the peripheral edge 111A of the disk 11A and are oppositely disposed beside the mounting slit 13A. Each of the arms 14A has a distal end 141A and a second inner side surface 142A. The second inner side surface 142A of one of the arms 14A faces the second inner side surface 142A of the other arm 14A, and is connected with a corresponding one of the first inner side surfaces 131A. The two engaging protrusions 15A protrude from the second inner side surfaces 142A of the arms 14A respectively. Preferably, each of the engaging protrusions 15A is disposed adjacent to the distal end 141A of the arm 14A.

As shown in FIGS. 2 and 3, to connect the interlocking pieces 10A, the disk 11A of a first one of the interlocking pieces 10A is inserted into the mounting slit 13A of a second one of the interlocking pieces 10A, and the engaging protrusions 15A of the second one of the interlocking pieces 10A oppositely engage in the center hole 12A of the first one of the interlocking pieces 10A. In this way, the arms 14A of the second one of the interlocking pieces 10A oppositely hold the disk 11A of the first one of the interlocking pieces 10A, and the interlocking pieces 10A are connected in series. Moreover, the engaging protrusions 15A of the first one of the interlocking pieces 10A are able to further engage in the center hole 12A of a last one of the interlocking pieces 10A. Thus, the interlocking pieces 10A are connected in a circle. Each of the interlocking pieces 10A is able to pivot on the center hole 12A or the engaging protrusions 15A.

Figure 4:
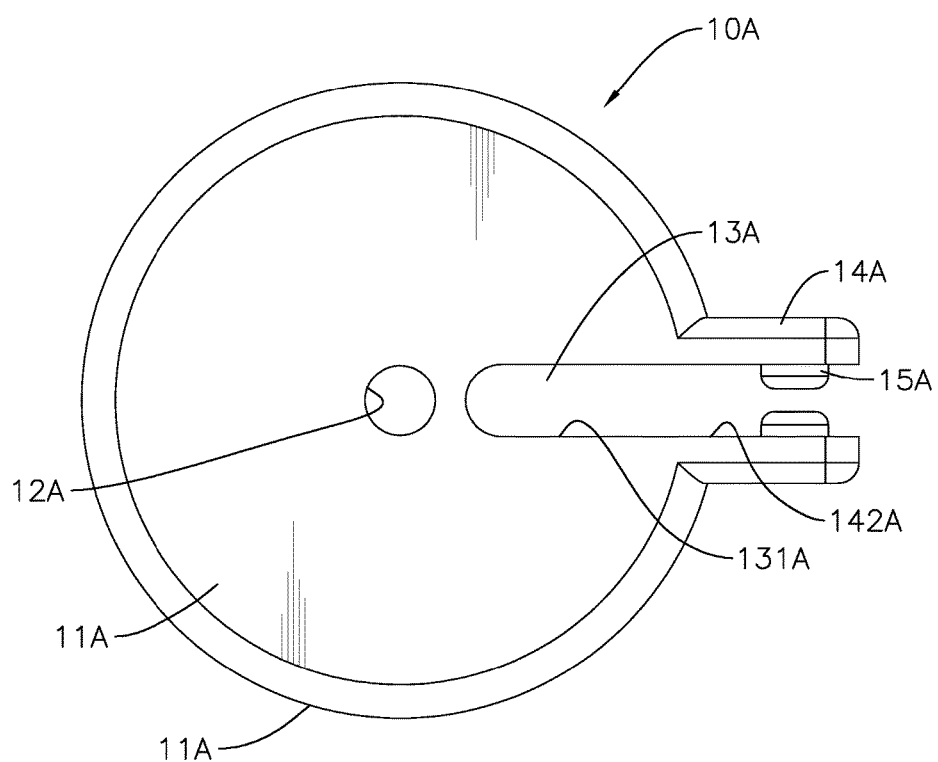
FIG. 4 is a top view of the interlocking piece in FIG. 1.
Figure 5:
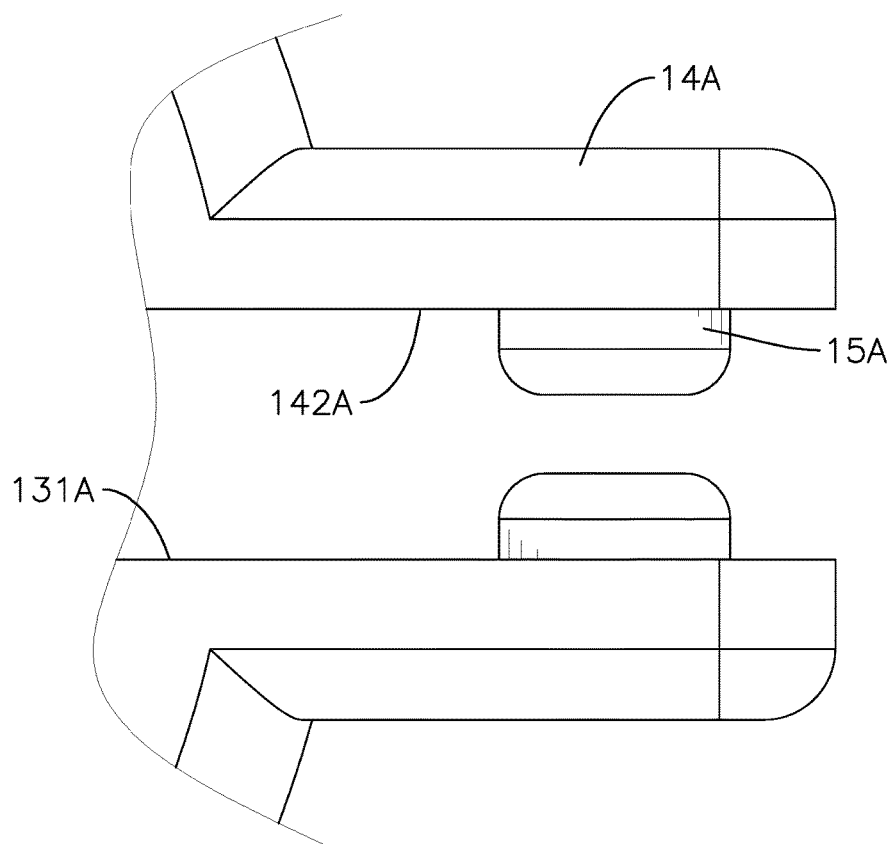
FIG. 5 is an enlarged top view of the interlocking piece in FIG. 1.

With further reference to FIGS. 4 and 5, in the first preferred embodiment, the second inner side surface 142A of each of the arms 14A is flush with the corresponding one of the first inner side surfaces 131A.

Figure 6:
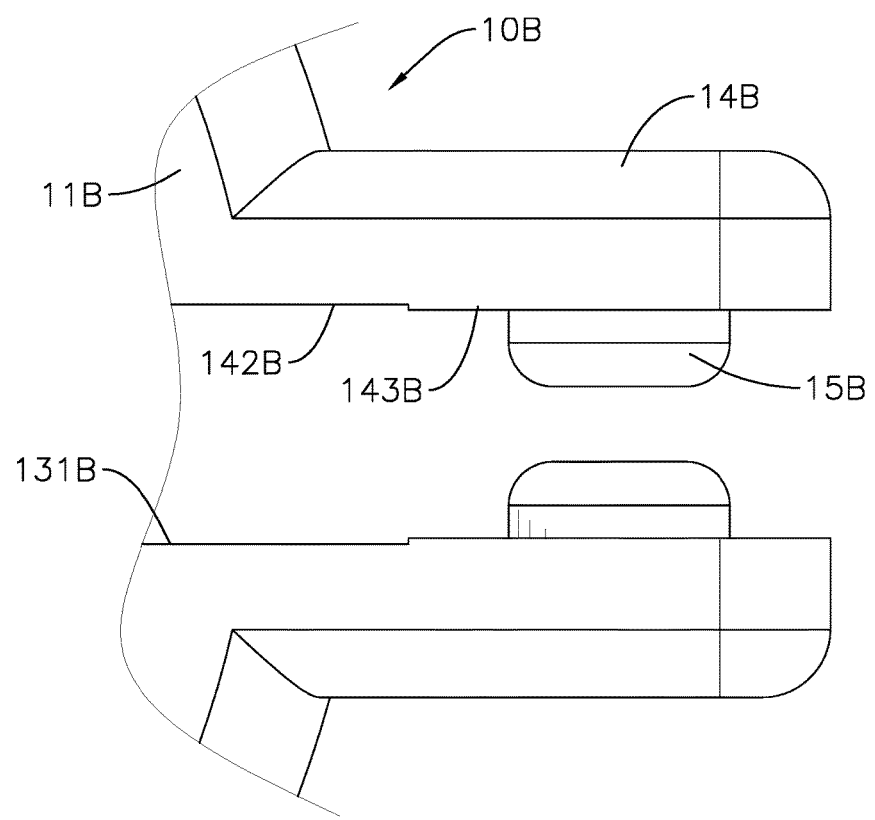
FIG. 6 is an enlarge top view of a second embodiment of an interlocking piece of an interlocking rotatable assembly in accordance with the present invention.

With further reference to FIG. 6, a second preferred embodiment of each of the interlocking pieces 10B is shown. The second preferred embodiment of the interlocking piece 10B differs from the first preferred embodiment of the interlocking piece 10A in that each of the arms 14B further has a holding protrusion 143B formed on the second inner side surface 142B and around the engaging protrusion 15B. A thickness of the holding protrusion 143B is less than a thickness of the engaging protrusion 15B.

Since a thickness of the disk 11B is hard to be exactly the same as a distance defined between the first inner side surfaces 131B and a distance defined between the second inner side surfaces 142B due to manufacturing error, the holding protrusions 143B can fill gaps between the arms 14B of the second one of the interlocking pieces 10B and the disk 11B of the first one of the interlocking pieces 10B when the arms 14B of the second one of the interlocking pieces 10B hold the disk 11B of the first one of the interlocking pieces 10B. Accordingly, with the holding protrusions 143B on the second inner side surfaces 142B of the arms 14B, the second one of the interlocking pieces 10B can stably hold the first one of the interlocking pieces 10B and the interlocking pieces 10B are able to stably pivot relative to each other.

Figure 7:
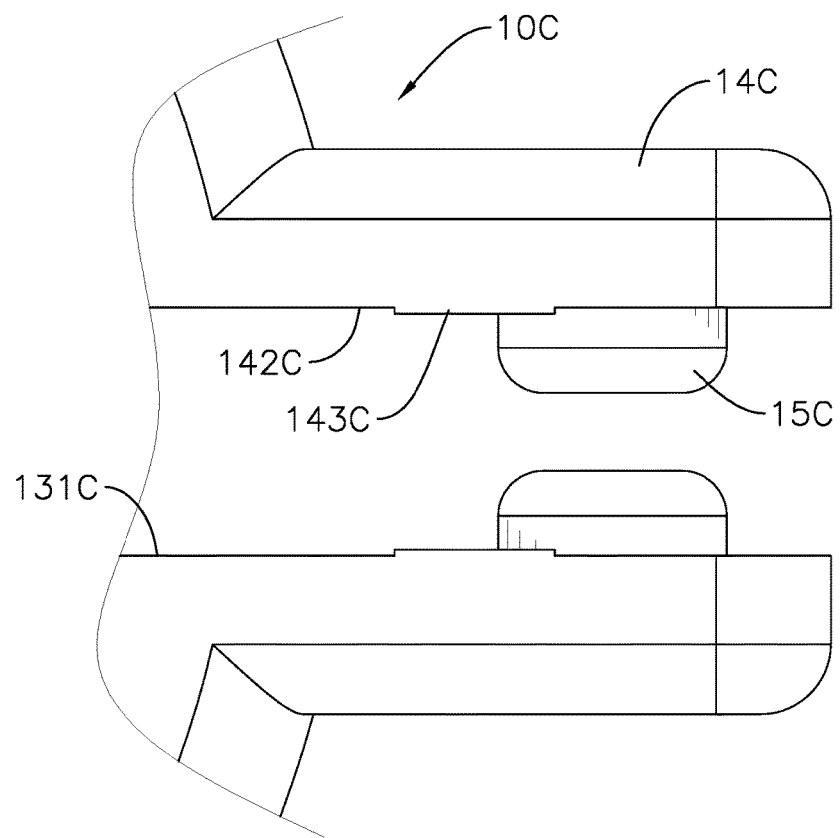
FIG. 7 is an enlarge top view of a third embodiment of an interlocking piece of an interlocking rotatable assembly in accordance with the present invention.

With further reference to FIG. 7, a third preferred embodiment of the interlocking piece 10C is shown. The third preferred embodiment of the interlocking piece 10C differs from the second preferred embodiment of the interlocking piece 10B in that the holding protrusion 143C of each of the arms 14C is formed on the second inner side surface 142C and is disposed between the engaging protrusion 15C and the first inner side surface 131C.

Figure 8:
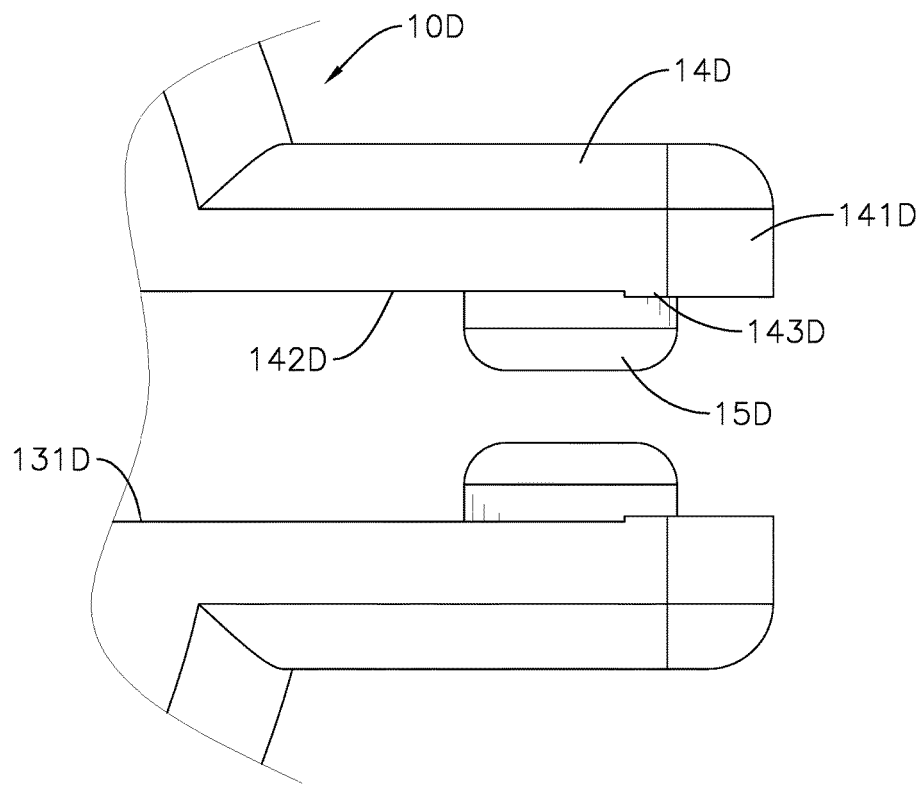
FIG. 8 is an enlarge top view of a fourth embodiment of an interlocking piece of an interlocking rotatable assembly in accordance with the present invention.

With further reference to FIG. 8, a fourth preferred embodiment of the interlocking piece 10D is shown. The fourth preferred embodiment of the interlocking piece 10D differs from the second preferred embodiment of the interlocking piece 10B in that the holding protrusion 143D of each of the arms 14D is formed on the second inner side surface 142D and is disposed between the engaging protrusion 15D and the distal end 141D of the arm 14D.

Figure 9:
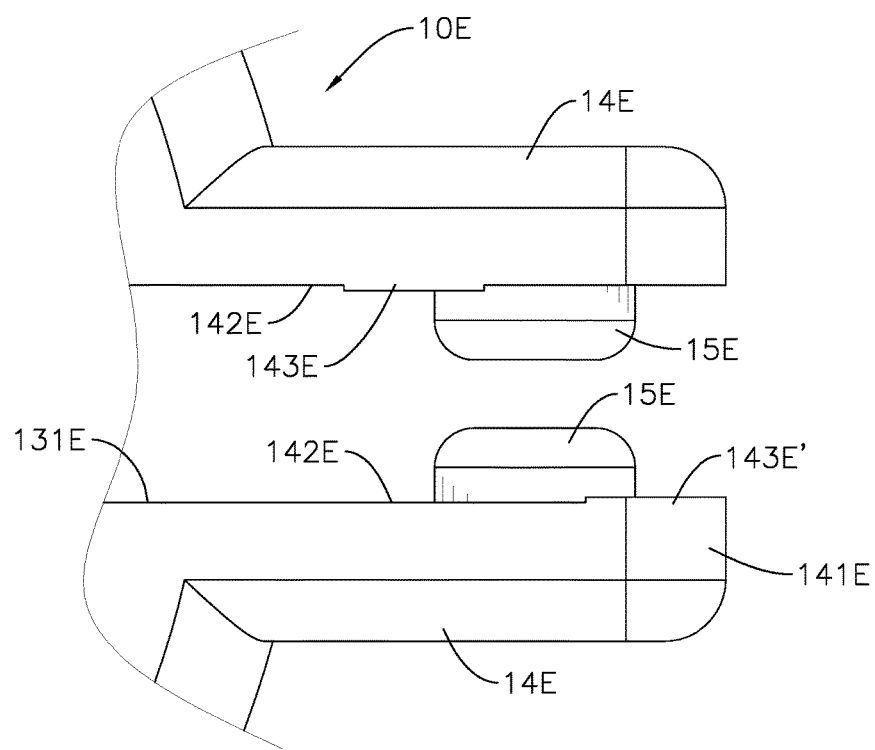
FIG. 9 is an enlarge top view of a fifth embodiment of an interlocking piece of an interlocking rotatable assembly in accordance with the present invention.

With further reference to FIG. 9, a fifth preferred embodiment of the interlocking piece 10E is shown. The fifth preferred embodiment of the interlocking piece 10E differs from the second preferred embodiment of the interlocking piece 10B in that the holding protrusion 143E of one of the arms 14E is formed on the second inner side surface 142E and is disposed between the engaging protrusion 15E and the first inner side surface 131E, and the holding protrusion 143E' of the other arm 14E is formed on the second inner side surface 142E and is disposed between the engaging protrusion 15E and the distal end 141E of the arm 14E.

Figure 10:
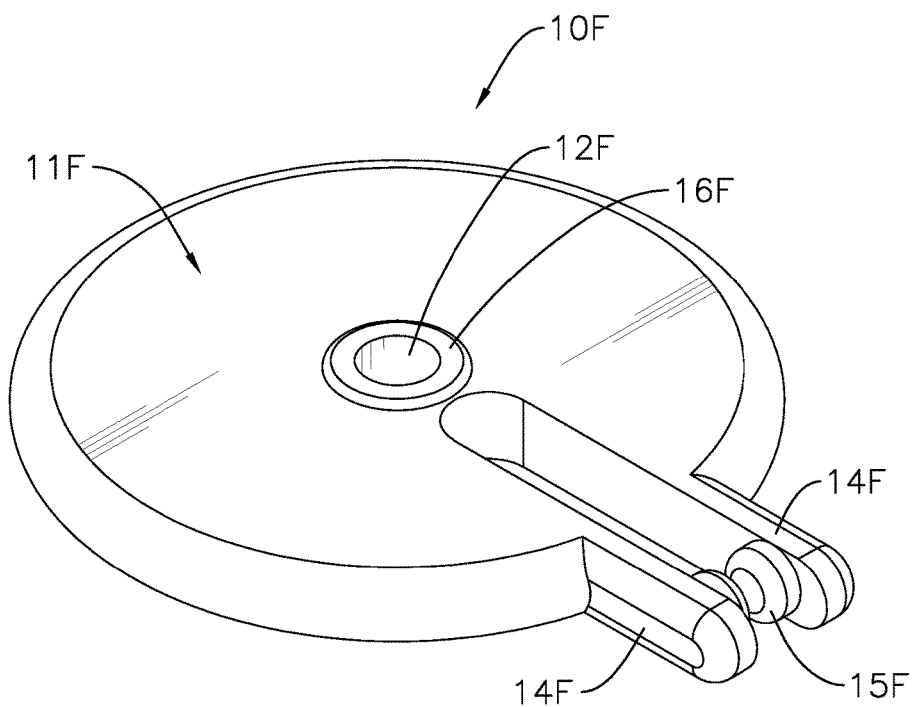
FIG. 10 is a perspective view of a sixth embodiment of an interlocking piece of an interlocking rotatable assembly in accordance with the present invention.

With further reference to FIG. 10, a sixth preferred embodiment of the interlocking piece 10F is shown. The sixth preferred embodiment of the interlocking piece 10F differs from the first preferred embodiment of the interlocking piece 10A in further having two annular protrusions 16F. The two annular protrusions 16F are respectively formed on the two opposite side surfaces of the disk 11F and around the center hole 12F. A thickness of each of the annular protrusions 16F is less than the thickness of the engaging protrusion 15F.

Thus, when the arms 14F of the second one of the interlocking pieces 10F hold the disk 11F of the first one of the interlocking pieces 10F, the annular protrusions 16F can fill the gaps between the arms 14F of the second one of the interlocking pieces 10F and the disk 11F of the first one of the interlocking pieces 10F when the arms 14F of the second one of the interlocking pieces 10F hold the disk 11F of the first one of the interlocking pieces 10F. Accordingly, the second one of the interlocking pieces 10F can stably hold the first one of the interlocking pieces 10F and the interlocking pieces 10F are able to stably pivot relative to each other.

Figure 11:
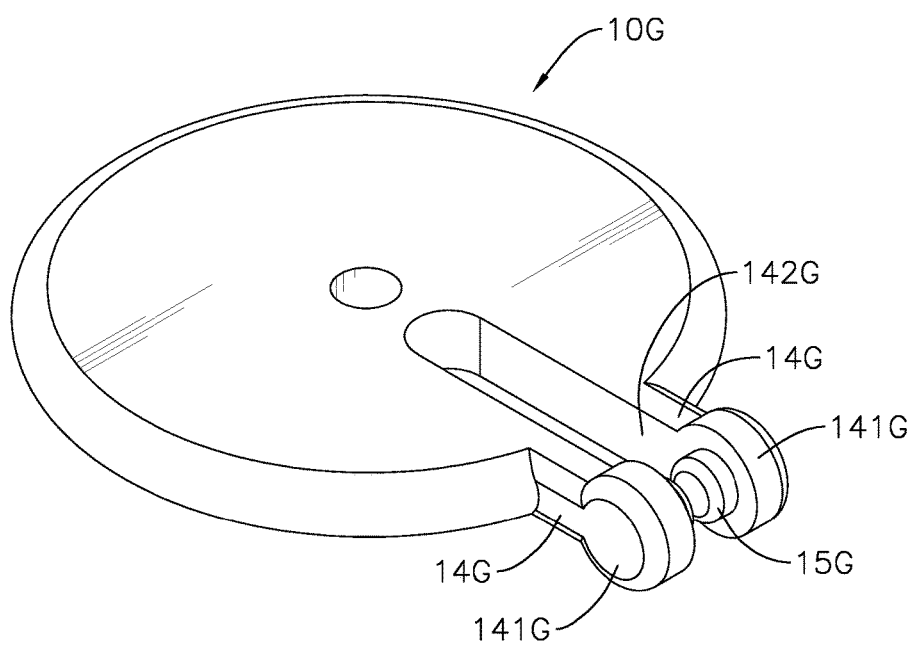
FIG. 11 is a perspective view of a seventh embodiment of an interlocking piece of an interlocking rotatable assembly in accordance with the present invention.
Figure 12:
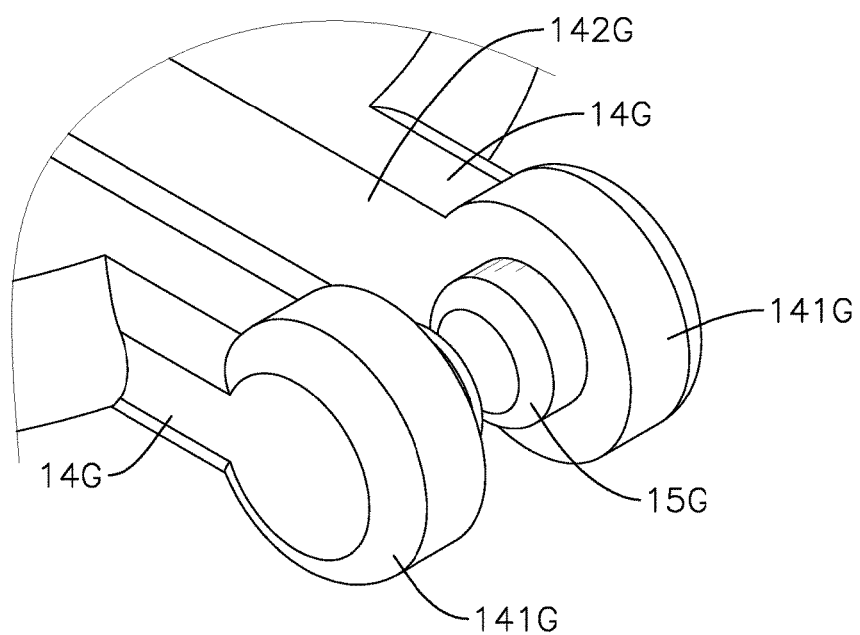
FIG. 12 is an enlarged perspective view of the interlocking piece in FIG. 11.

With further reference to FIGS. 11 and 12, a seventh preferred embodiment of the interlocking piece 10G is shown. The seventh preferred embodiment of the interlocking piece 10G differs from the first preferred embodiment of the interlocking piece 10A in that the distal end 141G of each of the arms 14G is enlarged and is cylindrical. The engaging protrusions 15G that respectively protrude from the second inner side surface 142G of the arms 14G are disposed at the cylindrical distal ends 141G of the arms 14G respectively.

Figure 13:
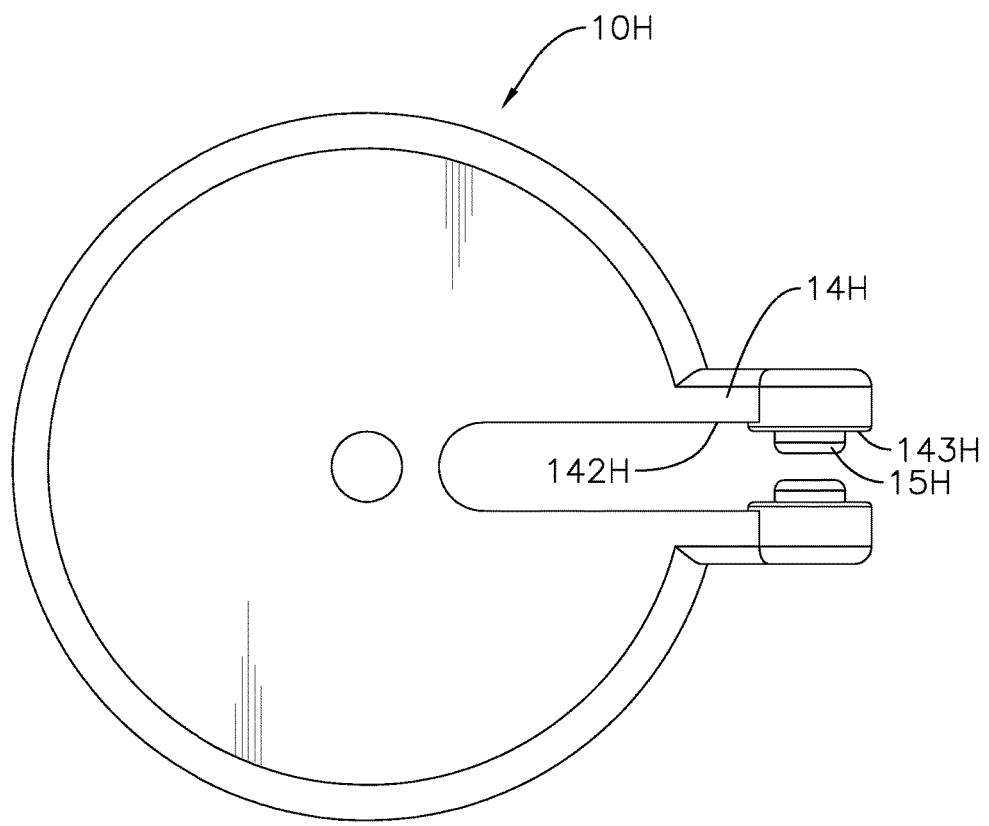
FIG. 13 is a top view of an eighth embodiment of an interlocking piece of an interlocking rotatable assembly in accordance with the present invention.
Figure 14:
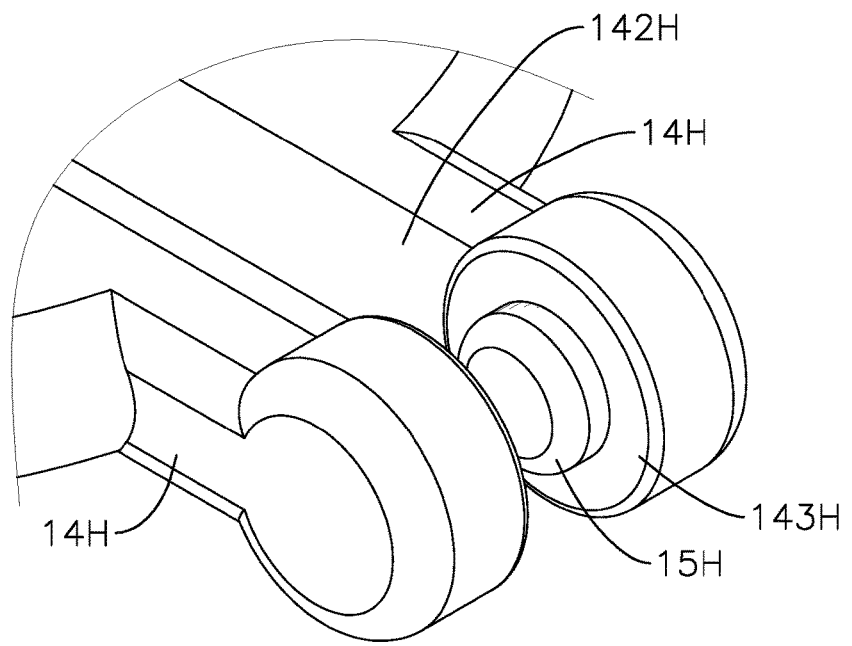
FIG. 14 is an enlarged perspective view of the interlocking piece in FIG. 13.

With further reference to FIGS. 13 and 14, a eighth preferred embodiment of the interlocking piece 10H is shown. The eighth preferred embodiment of the interlocking piece 10H differs from the seventh preferred embodiment of the interlocking piece 10G in that each of the arms 14H has a holding protrusion 143H formed on the second inner side surface 142H and around the engaging protrusion 15H.

Figure 16:
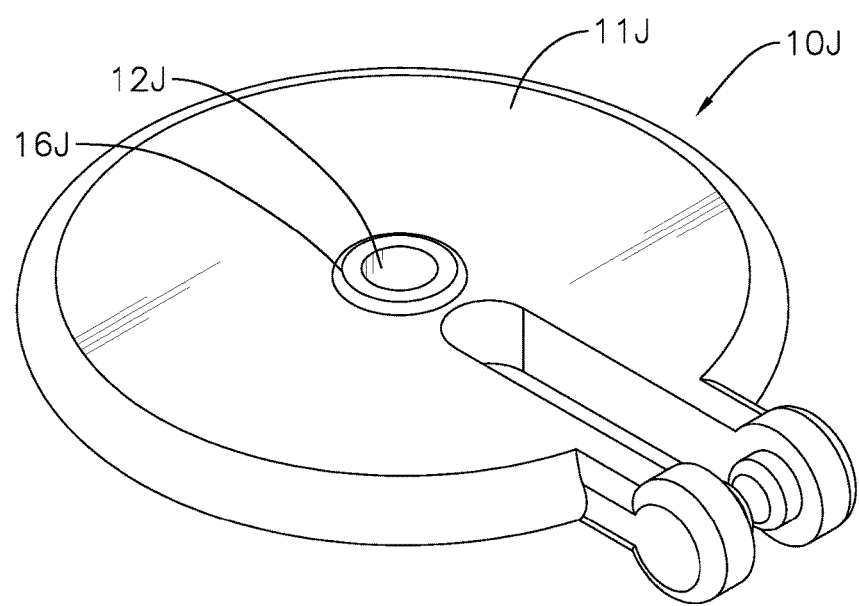
FIG. 16 is a perspective view of a ninth embodiment of an interlocking piece of an interlocking rotatable assembly in accordance with the present invention.
Figure 17:
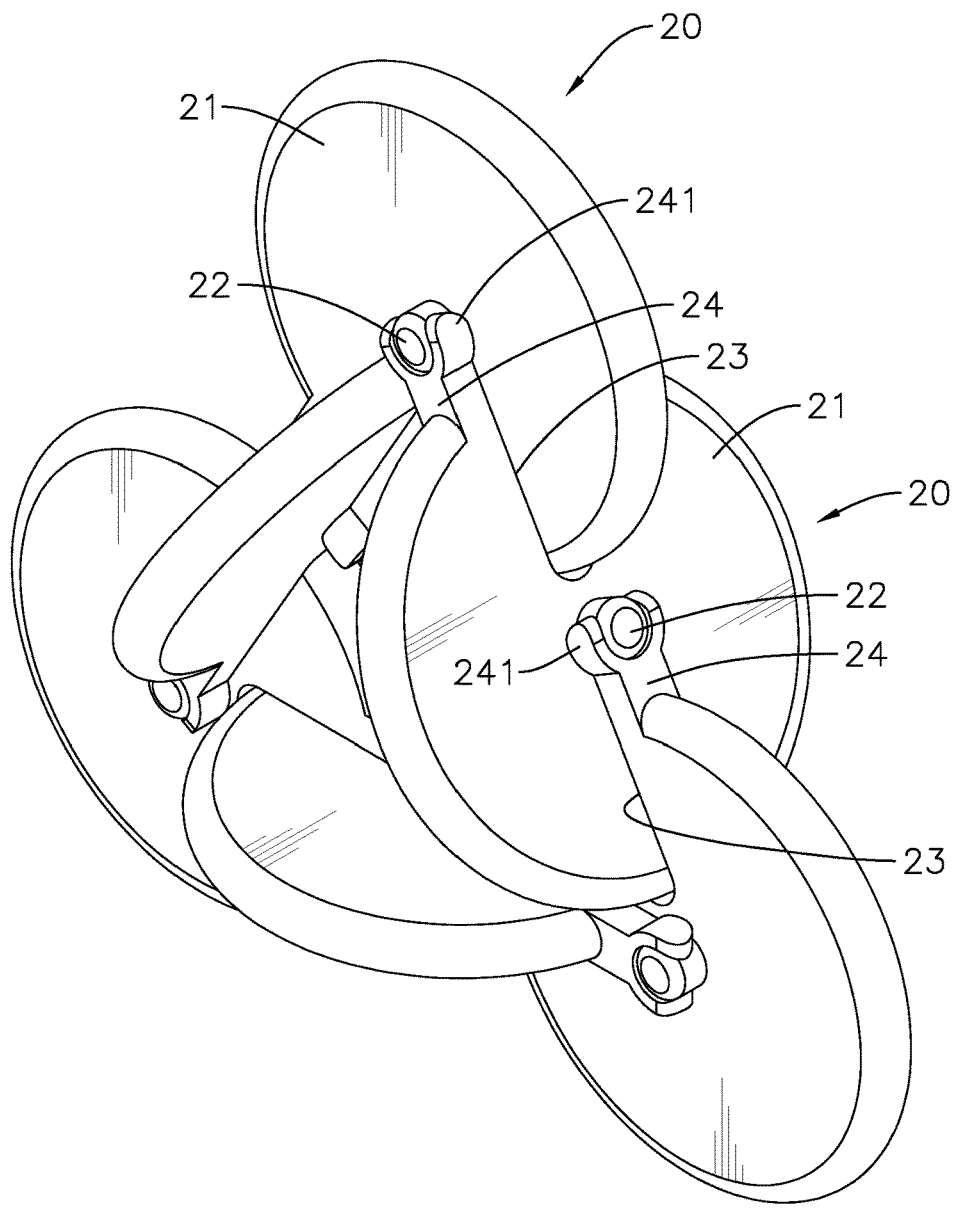
FIG. 17 is a perspective view of a conventional interlocking rotatable assembly in accordance with the prior art.
Figure 18:
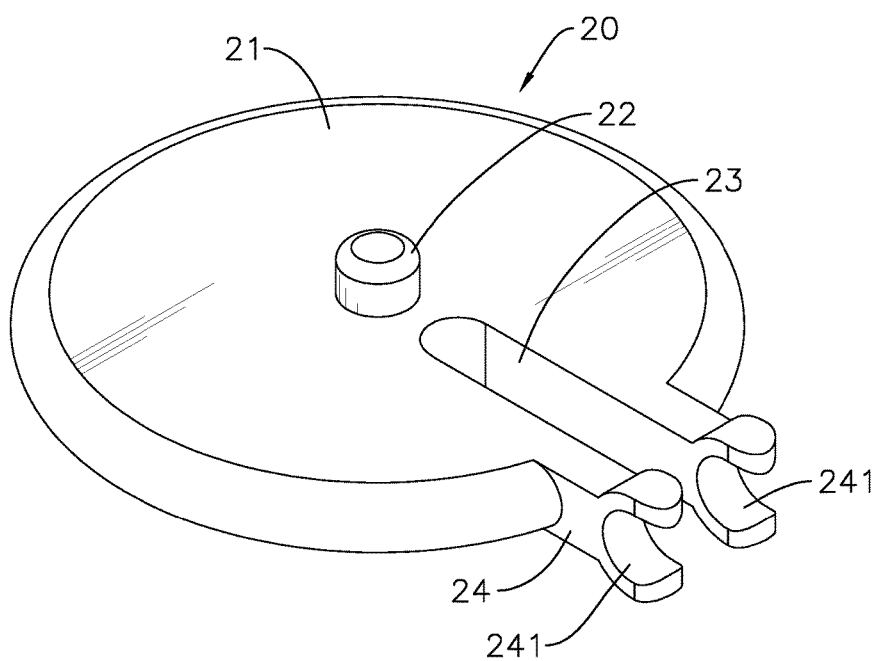
FIG. 18 is a perspective view of an interlocking piece of the conventional interlocking rotatable assembly in FIG. 17.

With further reference to FIG. 16, a ninth preferred embodiment of the interlocking piece 10J is shown. The ninth preferred embodiment of the interlocking piece 10J differs from the seventh preferred embodiment of the interlocking piece 10J in further having two annular protrusions 16J. The two annular protrusions 16F are respectively formed on the two opposite side surfaces of the disk 11J and around the center hole 12J.

The interlocking rotatable assembly as described has the following advantages. Since no undercut is formed on each of the interlocking pieces 10A, 10B, 10C, 10D, 10E, 10F, 10G, 1011, 10J, only a female die and a male die are needed when manufacturing the interlocking pieces 10A, 10B, 10C, 10D, 10E, 10F, 10G 10H, 10J by injection molding process. Therefore, molds and manufacturing process for manufacturing the interlocking piece 10A, 10B, 10C, 10D, 10E, 10F, 10G 10H, 10J are simplified. Accordingly, mold cost and manufacturing cost of the interlocking piece 10A, 10B, 10C, 10D, 10E, 10F, 10G 10H, 10J are reduced, and defect-free rate of the interlocking piece 10A, 10B, 10C, 10D, 10E, 10F, 10G, 10H, 10J can be increased.

Figure 15:
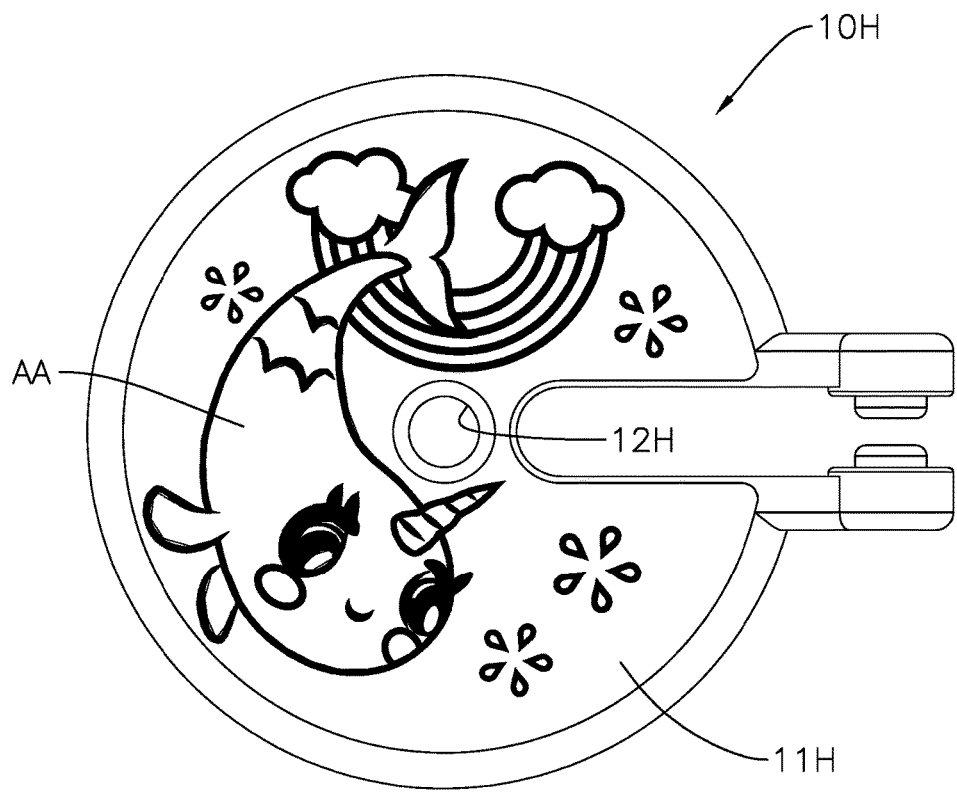
FIG. 15 is an operational top view of the interlocking piece in FIG. 13.

In addition, with further reference to FIG. 15, since each of the interlocking piece 10H is formed with the center hole 12H, the side surfaces of the disk 11H are flat planes. Thus, each of the interlocking piece 10H can be decorated with patterns AA by easily printing the patterns AA on the side surfaces of the disk 11H.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An interlocking rotatable assembly comprising multiple interlocking pieces, and each of the interlocking pieces having
    a disk having two opposite side surface and an outer peripheral edge;
    a center hole disposed at a center of the disk and formed through the two opposite side surfaces of the disk;
    a mounting slit formed in the peripheral edge of the disk and extending along a radial direction of the disk, wherein two first inner side surfaces are oppositely defined in the mounting slit;
    two arms parallelly protruding from the peripheral edge of the disk and oppositely disposed beside the mounting slit, and each of the arms having
        a distal end; and
        a second inner side surface, and the second inner side surface of one of the arms facing the second inner side surface of the other arm, and connected with a corresponding one of the first inner side surfaces; and
    two engaging protrusions protruding from the second inner side surfaces of the arms respectively;
    wherein the disk of a first one of the interlocking pieces is inserted into the mounting slit of a second one of the interlocking pieces, and the engaging protrusions of the second one of the interlocking pieces oppositely engage in the center hole of the first one of the interlocking pieces.

2. The interlocking rotatable assembly as claimed in claim 1, wherein the second inner side surface of each of the arms is flush with the corresponding one of the first inner side surfaces.

3. The interlocking rotatable assembly as claimed in claim 2, wherein
    each of the arms further has a holding protrusion formed on the second inner side surface and around the engaging protrusion; and
    a thickness of the holding protrusion is less than a thickness of the engaging protrusion.

4. The interlocking rotatable assembly as claimed in claim 2, wherein
    each of the arms further has a holding protrusion formed on the second inner side surface and disposed between the engaging protrusion and the first inner side surface; and
    a thickness of the holding protrusion is less than a thickness of the engaging protrusion.

5. The interlocking rotatable assembly as claimed in claim 2, wherein
    each of the arms further has a holding protrusion formed on the second inner side surface and disposed between the engaging protrusion and the distal end of the arm; and
    a thickness of the holding protrusion is less than a thickness of the engaging protrusion.

6. The interlocking rotatable assembly as claimed in claim 2, wherein
    each of the arms further has a holding protrusion formed on the second inner side surface, the holding protrusion of one of the arms is disposed between the engaging protrusion and the first inner side surface, and the holding protrusion of the other arm is disposed between the engaging protrusion and the distal end of the arm; and
    a thickness of the holding protrusion is less than a thickness of the engaging protrusion.

7. The interlocking rotatable assembly as claimed in claim 2, wherein
- each of the interlocking pieces has two annular protrusions, and the two annular protrusions are respectively formed on the two opposite side surfaces of the disk and around the center hole; and
- a thickness of each of the annular protrusions is less than the thickness of the engaging protrusion.

8. The interlocking rotatable assembly as claimed in claim 2, wherein
- the distal end of each of the arms is enlarged and is cylindrical; and
- the engaging protrusions that respectively protrude from the second inner side surface of the arms are disposed at the cylindrical distal ends of the arms respectively.

9. The interlocking rotatable assembly as claimed in claim 8, wherein
- each of the arms further has a holding protrusion formed on the second inner side surface and around the engaging protrusion; and
- a thickness of the holding protrusion is less than a thickness of the engaging protrusion.

10. The interlocking rotatable assembly as claimed in claim 8, wherein
- each of the interlocking pieces has two annular protrusions, and the two annular protrusions are respectively formed on the two opposite side surfaces of the disk and around the center hole; and
- a thickness of each of the annular protrusions is less than the thickness of the engaging protrusion.

* * * * *